United States Patent [19]

Hara et al.

[11] Patent Number: 4,480,277
[45] Date of Patent: Oct. 30, 1984

[54] INFORMATION PROCESSING SYSTEM
[75] Inventors: Teruya Hara; Kenzo Ina, both of Yokohama, Japan
[73] Assignee: Canon Kabushiki Kaisha, Tokyo, Japan
[21] Appl. No.: 406,314
[22] Filed: Aug. 9, 1982
[30] Foreign Application Priority Data Aug. 21, 1981 [JP] Japan .................... 56-130208

[51] Int. Cl.³ .................................. G11B 5/012
[52] U.S. Cl. ............................. 360/69; 369/30
[58] Field of Search ............. 360/69, 71, 72.1, 72.2, 360/75, 78; 369/30, 32, 33, 34, 36, 43, 44, 93, 96, 98, 99, 124, 128

Primary Examiner—George G. Stellar
Attorney, Agent, or Firm—Fitzpatrick, Cella, Harper & Scinto

[57] ABSTRACT

An information processing system processes identification of a track address and a sector address, control of timing, control of reading and writing of data and error checking with reduced intervention of a CPU to a magnetic disc unit so that the throughput of the CPU is increased and performance for data processing is improved. A predetermined number of sectors are processed in sequence, and a greater number of sectors than the number of sectors in one track can be processed by hardware implementation. This system can also control magnetic disc units having different formats.

11 Claims, 5 Drawing Figures

INFORMATION PROCESSING SYSTEM

BACKGROUND OF THE INVENTION

1. Field of the Invention

The present invention relates to an information processing system having reduced direct intervention of a CPU to a magnetic disc unit.

2. Description of the Prior Art

In an information processing system which transfers data to and from a magnetic disc unit, efficiency of data transfer largely depends on the performance of a processor in the information processing system. A sector format is determined largely depending on the performance of the processor and a split sector format, a sequential sector format or the like may be selected. In the split sector format, sector addresses to a sequence of physical sectors on one track are assigned at an interval of one or more. In order access to all areas of the track, two revolutions of the disc are required for the split sector format having an interval of one and more revolutions are required for the split sector format having the interval of more than one. This is explained below in further detail.

FIG. 1 shows a block diagram of prior art system, in which numeral 1 denotes a central processing unit (CPU), numerals 2a and 2b denote latches, numeral 3 denotes a disc storage unit, numeral 4 denotes a buffer, and numeral 5 denotes an error check circuit.

FIG. 2 shows a data format (split sector format) to be processed by the system shown in FIG. 1. When a sector (SC) #6 designated by A in FIG. 2 is to be processed the CPU 1 instructs the disc storage 3 to read the sector #6 and write the content of the sector #6 in the buffer 4. Then, in time periods T=3 and T=4, the CUP 1 checks any error in the content of the sector #6 with the error check circuit 5 based on a signal from the latch 2b. The CPU 1 then determines if the next sector is to be processed or not. This process is called a sector interleave. In the illustrated example, the sector interleave process requires three revolutions of the disc to process all of the sectors on one track and hence a long process time is required.

In the sequential sector format, the sector addresses are assigned in the sequence of physical sectors on one track. In order to process the sectors in sequence, a high speed processor and complex control are required. As a result, hardware volume increases.

In a data storage such as a magnetic disc unit, a sector format usually comprises, as shown in FIG. 3, a gap 1 (G1) which is a synchronizing area for processing an ID field and starts at a sector pulse (SP), an identification field (ID) which stores address data and an attribute of a data field, a gap 2 (G2) which is a blank area between the ID field and the data field and used to synchronize the data field, the data field (DATA) which stores real data, and a gap 3 (G3) which is a dummy area at the end of the sector. In a conventional control system, the gap 3 is used to identify a boundary between the sectors and to allow a higher order unit to set a status. Thus, one sector comprises the gaps G1, G2, and G3 and the ID field and the data field. The data field is accessed to read or write the data (real data) to be processed. In order to assure correct access to a specified sector on a specified track, the ID field is read and compared.

In the sequential sector format, a checking process and a software process have to be carried out in a short time during the gaps G1, G2 and G3. Consequently, complex and fast control is required and hence hardware volume increases and an expensive control circuit is required.

SUMMARY OF THE INVENTION

It is a first object of the present invention to provide an information processing system which, by hardware implementation, can sequentially process a predetermined number of sectors without considerable intervention of a CPU and can process a greater number of sectors than the number of sectors in one track.

It is a second object of the present invention to provide an information processing system which can control the connection of storages having different sector formats.

DETAILED DESCRIPTION OF THE PREFERRED EMBODIMENTS

Figure 4:
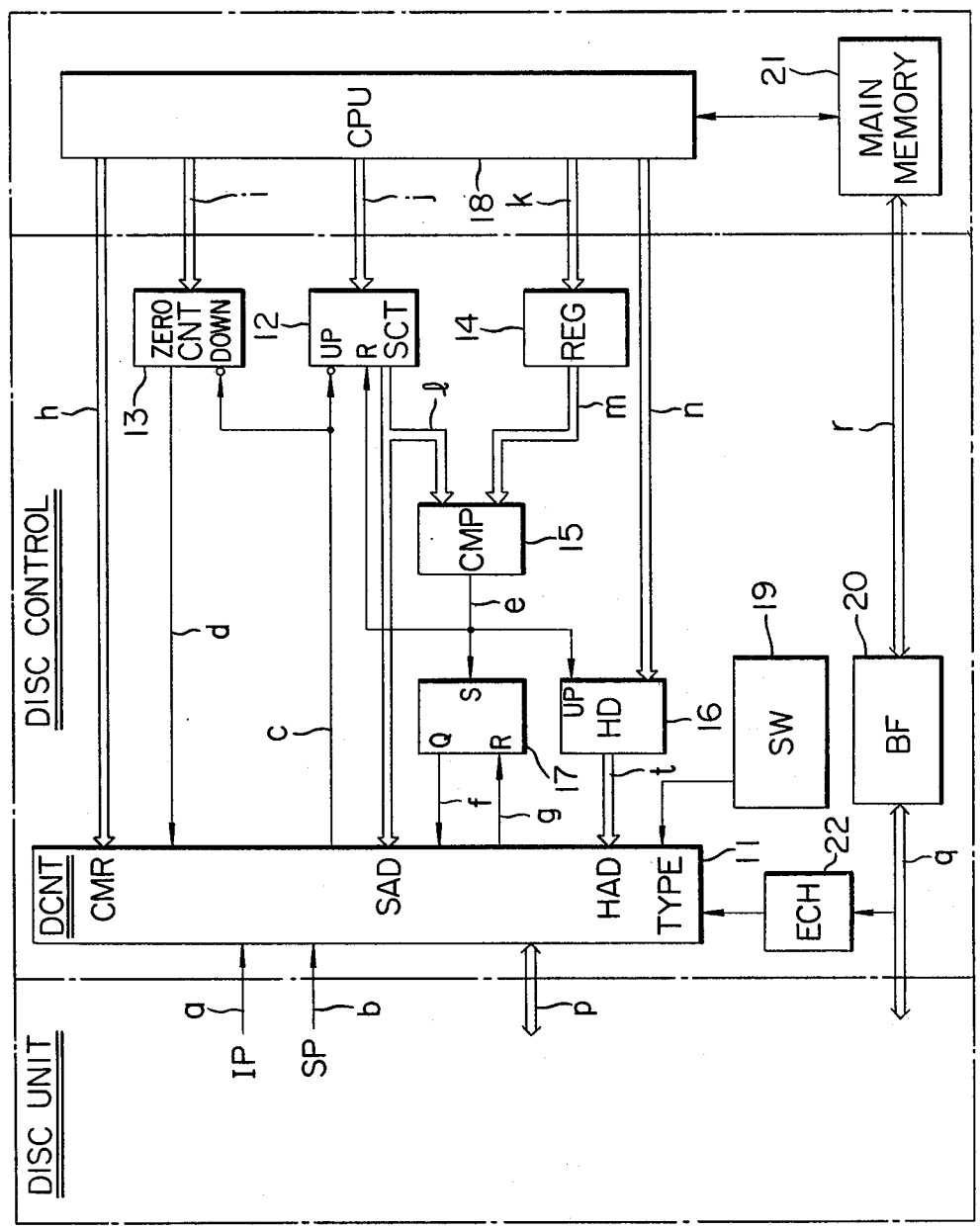
FIG. 4 is a block diagram on one embodiment of an information processing system of the present invention.

Referring to FIG. 4 which shows a configuration of the information processing system of the present invention, numeral 11 denotes a disc controller (DCNT) which detects a requested sector by an external signal and processes data on a magnetic disc, that is, reads or writes the data in accordance with an instruction. The disc controller may be a conventional one. Numeral 12 denotes a counter (SCT) which stores a sector address to be processed and to be referred by the DCNT 11, and is counted up by a pulse C which is produced by the DCNT 11 for each processing of sector. A requested start sector address is stored therein from a higher order unit (CPU) 18 through a signal line j. The output signal from the SCT 12 is supplied to a comparator (CMP) 15 through a signal line 1 and also supplied to the DCNT 11 as a sector address signal (SAD). Numeral 13 denotes a decrement counter (CNT) which is decremented by the pulse C. The number of sectors to be processed is stored therein from the CPU 18 through a signal line i and the CNT 13 produces an output signal d when the content thereof is decremented to zero. Numeral 14 denotes a register (REG) in which the number of sectors in one track of a disc used is stored from the CPU 18 through a signal line k and the REG 14 produces an output signal on a signal line m. The CMP 15 compares the content of the SCT 12 (signal on the signal line l) with the content of the REG 14 (signal on the signal line m) and produces an output signal e when they are equal. The SCT 12 is reset by the output signal e of the CMP 15.

Numeral 16 denotes a counter (HD) which stores a process start track address to be referred by the DCNT 11 and is counted up by the output signal e from the CMP 15 to increment the track address. A requested track address is stored therein from the CPU 18 through a signal line n and the HD 16 supplies an output signal to the DCNT 11 through a signal line t. Numeral 17 denotes a head selection request signal generator which is set by the output signal e of the CMP 15 to supply a head selection request signal f to the DCNT 11 and reset by a signal g from the DCNT 11 when the head selection is completed.

A signal line h supplies various instructions from the CPU 18 to a command register (CMR) of the DCNT 11 to activate the DCNT 11, a signal line p supplies a control signal for the disc unit and a detection signal of the disc unit, and a signal line q is used to transfer data between the disc unit and a buffer memory (BF) 20. An error check circuit (ECH) 22 supplies the data received from the signal line q to the DCNT 11 to detect an error. A signal line r is used to transfer data between a main memory 21 of the CPU 18 and the BF 20.

Figure 1:
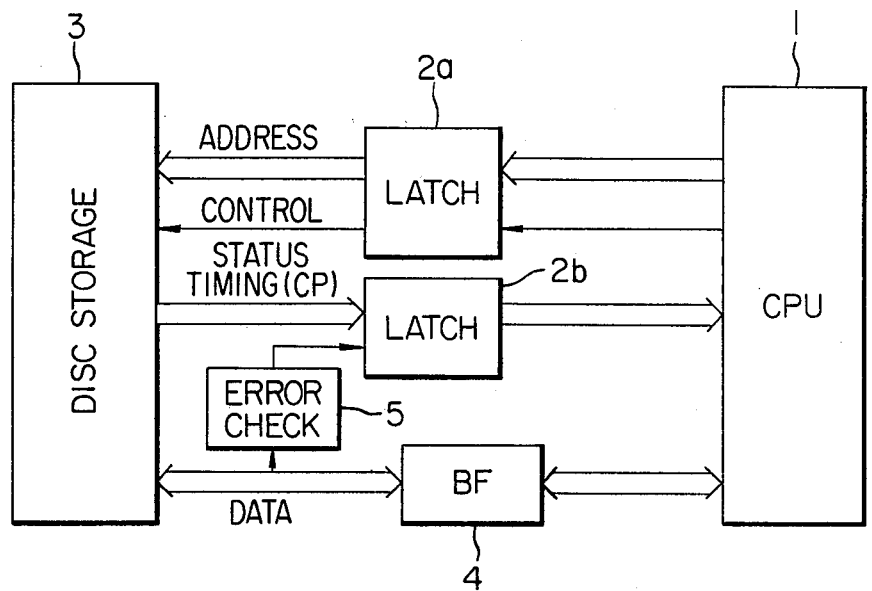
FIG. 1 is a block diagram of a prior art information processing system.
Figure 2:
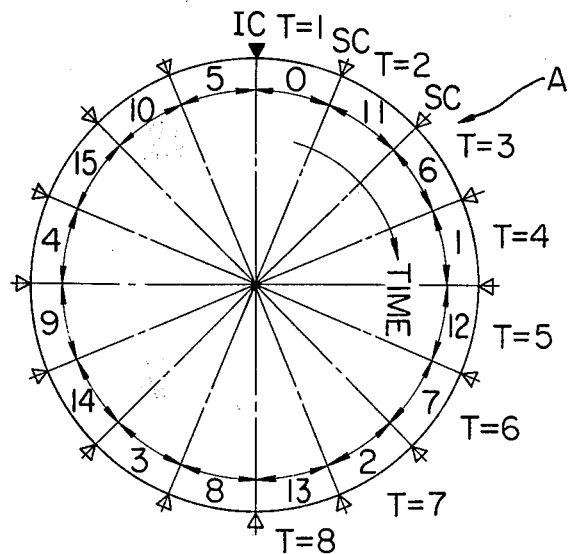
FIG. 2 shows a split sector format.
Figure 3:
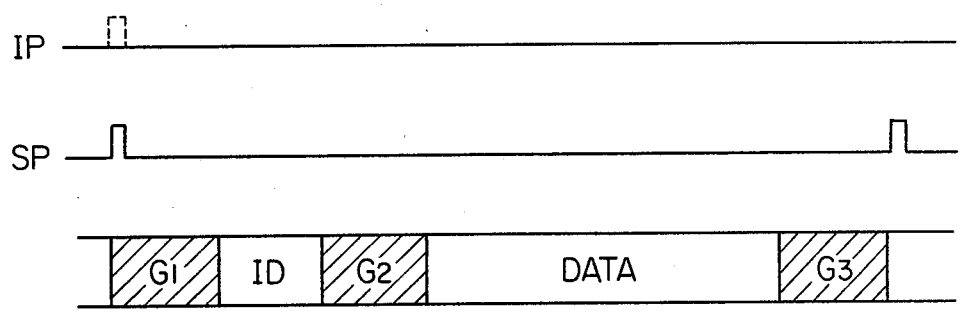
FIG. 3 shows a sector format of a magnetic disc unit.
Figure 5:
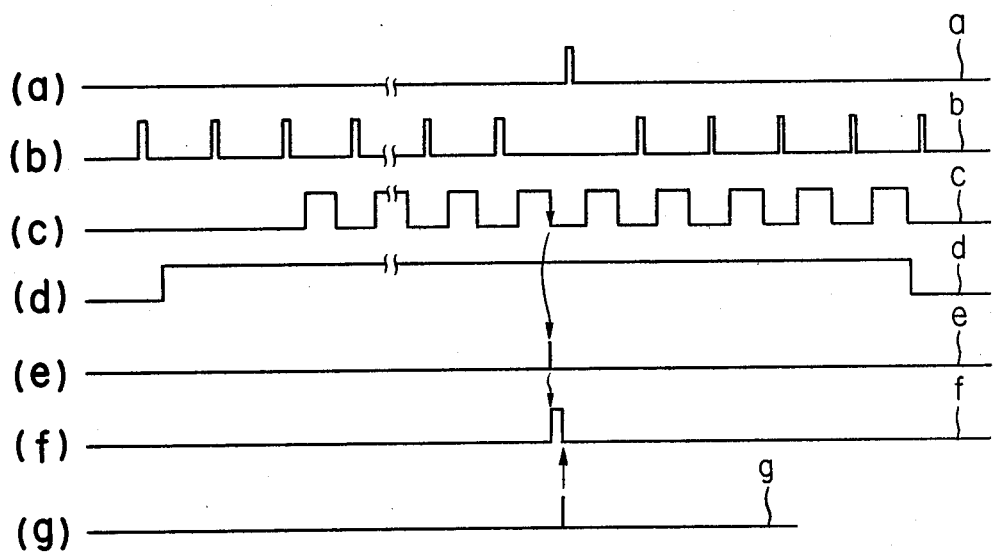
FIG. 5, consisting a–g, shows major signal waveforms for explaining the operation of FIG. 4.

FIG. 5 shows a time chart of various signals. A waveform (a) shows an index pulse IP from the disc storage, a waveform (b) shows a sector pulse SP, a waveform (c) shows a signal which is "1" during the sector processing by the DCNT 11, a waveform (d) shows a zero output signal of the CNT 13, a waveform (e) shows an output signal of the CMP 15, a waveform (f) shows a head selection control signal, and a waveform (g) shows a signal which is produced when the head selection is completed.

The operation of the information processing system for the present invention is now explained with reference to the configuration shown in FIG. 4 and the signal waveforms (a)-(g) shown in FIG. 5. In the following description, it is assumed that a certain cylinder (track) address has been set in the HD 16 under the control of the CPU 18 and the magnetic head is positioned at the same address.

When n sectors are to be sequentially processed, the CPU 18 sets the requested start sector address in the SCT 12 through the signal line j and sets the number of sectors in the CNT 13 through the signal line i. Thus, when the sector address of the disc storage reaches the content of the SCT 12, the DCNT 11 executes the processing in accordance with a preset read or write instruction.

When the processing of one sector is completed, the DCNT 11 produces the output signal C. At a falling edge of the output signal C, the content of the CNT 13 is decremented by one and the content of the SCT 12 is incremented by one.

If the content of the CNT 13 reaches zero at this time, the processing is terminated. If it is not zero, the processing is repeated in accordance with the updated content of the SCT 12. When the signal content supplied from the SCT 12 through the signal line l becomes equal to the signal content supplied from the REG 14 through the signal line m during the processing, the CMP 15 produces the equal signal e (see FIG. 4), which resets the SCT 12 to zero. The equal signal e also causes the content of the HD 16 to be incremented by one and also causes the head selection request signal generator 17 to produce the head selection request signal f. After the head selection, the DNCT 11 supplies the signal g to a reset terminal R of the head selection request signal generator 17 to reset the signal f. Thereafter, the sectors of the next track are processed in accordance with the updated contents of the SCT 12 and the REG 14. This process is repeated until the content of CNT 13 reaches zero. When the content of the CNT 13 reaches zero, the processing for the sequential sectors is terminated and the end of the processing is reported to the CPU 18 by conventional interrupt request means.

The data transfer between the main memory 21 and the disc unit is carried out through the BF 20.

In order for the DCNT 11 to control the data processing for various types of magnetic disc units, the DCNT 11 is constructed to operate by designation by a switch (SW) 19 which designates a particular format. The format designation includes the number of sectors and the data format (data length) for each disc unit. Various parameters compatible to the performance (transfer rate, storage capacity, etc.) of the disc unit are set to the DCNT 11 by the SW 19. For example, the number of words of the data format (e.g. 128 bytes or 256 bytes) is set in a presettable counter (not shown) in the DCNT 11.

As described hereinabove, according to the present invention, the CPU need only control the data processing of the storage such as the magnetic disc unit at the beginning and the end of the processing and it does not need to identify the track address and the sector address, control the timing, control the data read/write or check the error.

Accordingly, the throughput of the CPU is improved.

The present invention is suitably adapted to a multiprocessing system and a system which controls the data processing of a plurality of input/output devices including the disc unit with a signal processor.

In accordance with the present invention, since the DCNT 11 can identify the parameters for various storages, a versatile information processing system is provided.

While the CNT 13, the SCT 12 and the HD 16 are shown in FIG. 4 as independent circuits from the DCNT 11 for facilitating understanding, they may be usually implemented by a RAM and registers in the DCNT 11. In essence, the hardware elements for those functions can be included in the DCNT 11.

What we claim is:

1. An information processing system operable with a magnetic disc, comprising:
   a magnetic disc unit for reading and writing information to and from a magnetic disc;
   disc control means for receiving an index signal, a sector signal and a detection signal from said magnetic disc unit and supplying a control signal to said magnetic disc unit;
   processing means for supplying to said magnetic disc units necessary for information processing; and
   instruction means for indicating the beginning and the end of information processing to said magnetic disc unit and providing necessary instructions to said processing means prior to information processing.

2. An information processing system according to claim 1, wherein said processing means supplies to said disc control means a track address signal for specifying a track address, a sector address signal for specifying a sector address, an equal signal for indicating equality between the number of sectors to be processed and the number of sectors processed and a head selection request signal for requesting head selection, as signals necessary for the information processing.

3. An information processing system according to claim 1 or 2, wherein said instruction means provides instructions to said processing means on a requested track address, the number of sectors contained in one track, a start sector address and the number of sectors to be processed, as the necessary instructions prior to information processing.

4. An information processing system according to claim 1 or 2 further comprising:

format specifying means for specifying a format of the magnetic disc unit and connected to said disc control means to allow said disc control means to carry out sequential processing of the specified format.

5. An information processing system operable with a magnetic disc unit that reads and writes information from and to a magnetic disc, comprising:

disc control means for controlling reading and writing of information from and to a magnetic disc by a magnetic disc unit;

processing means for supplying to said disc control means a track address signal for specifying a track address, a sector address signal for specifying a sector address, an equal signal for indicating equality between the number of sectors to be processed and the number of sectors processed and a head selection request signal for requesting head selection all for information processing; and instruction means for indicating the beginning and the end of information processing to said disc control means and indicating to said processing means a requested track address, the number of sectors contained in one track, a start sector address and the number of sectors to be processed.

6. An information processing system according to claim 5 further comprising:

format specifying means for specifying a format of the magnetic disc unit connected to said disc control means to allow said disc control means to carry out sequential processing of the specified format.

7. An information processing system operable with a magnetic disc by using a head, comprising:

a higher order unit for processing sectors;

counter means for setting a start sector address for processing information stored sector-wise on a magnetic disc, and for counting the number of the sectors processed;

track address setting means for storing a track address on the magnetic disc;

sector count setting means for storing the number of sectors contained in one track;

control means for comparing the content of said count means with the content of said sector count setting means, and for incrementing the content of said track address setting means and switching a head when the processing of one track is completed;

compare means for comparing the total number of sectors requested to be processed by said higher order unit with the number of sectors processed; and disc control means responsive to the output of said compare means to sequentially read or write the information stored sector-wise until the number of sectors processed reaches the total number of sectors requested to be processed.

8. An information processing system according to claim 7 further comprising:

format specifying means for specifying a format of the magnetic disc unit and connected to said disc control means to allow said disc control means to carry out sequential processing of the specified format.

9. An information processing system operable with a magnetic disc, comprising:

disc control means for controlling reading and writing of information from and to a magnetic disc unit;

counter means for setting a start sector address for processing information stored sector-wise on a magnetic disc, for counting the number of the sectors processed, and for supplying a count signal to said disc control means;

track address setting means for supplying a signal for specifying a track address on the magnetic disc to said disc control means;

sector count setting means for storing the number of sectors contained in one track;

control means for comparing the content of said counter means with the content of said sector count setting means and incrementing the content of said track address setting means when the information processing for one track is completed;

head selection means responsive to a signal from said control means for supplying a head selection request signal to said disc control means;

compare means for comparing the total number of sectors requested to be processed with the number of sectors processed and supplying a compare signal to said disc control means; and instruction means for indicating the beginning and the end of information processing to said disc control means, providing the requested track address to said track address setting means, providing the number of sectors contained in one track to said sector count setting mean, providing the start address to said counter and providing the total number of sectors requested to be processed to said compare means.

10. An information processing system according to claim 9, wherein said disc control means provides the number of sectors processed to said counter means and said compare means.

11. An information processing system according to claim 9 or 10 further comprising:

format specifying means for specifying a format of the magnetic disc unit connected to said disc control means to allow said disc control means to carry out sequential processing of the specified format.

* * * * *

UNITED STATES PATENT AND TRADEMARK OFFICE
CERTIFICATE OF CORRECTION

PATENT NO. : 4,480,277
DATED : October 30, 1984
INVENTOR(S) : TERUYA HARA, ET AL.

It is certified that error appears in the above-identified patent and that said Letters Patent is hereby corrected as shown below:

Col. 1, line 19, change "access to all" to --to access all--;

line 49, delete "a" (first occurrence).

Col. 2, line 26, change "Fig. 5, consisting" to --Fig. 5 consisting of waveforms--.

Col. 3, line 26, change "for" to --of--;

line 59, change "DNCT" to --DCNT--.

Col. 4, line 48, change "units" to --unit signals--;

line 60, between "as" and "signals" insert --the--;

line 61, delete "the".

Signed and Sealed this

Twenty-third Day of July 1985

[SEAL]

Attest:

DONALD J. QUIGG

Attesting Officer    Acting Commissioner of Patents and Trademarks